US009923967B2

(12) United States Patent
Burr et al.

(10) Patent No.: US 9,923,967 B2
(45) Date of Patent: *Mar. 20, 2018

(54) STORAGE MANAGEMENT SYSTEM FOR PRESERVING CONSISTENCY OF REMOTE COPY DATA

(71) Applicant: International Business Machines Corporation, Armonk, NY (US)

(72) Inventors: Dale Burr, Winchester (GB); Henry Esmond Butterworth, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/954,841

(22) Filed: Nov. 30, 2015

(65) Prior Publication Data
US 2016/0088081 A1    Mar. 24, 2016

Related U.S. Application Data

(63) Continuation of application No. 13/457,766, filed on Apr. 27, 2012, now Pat. No. 9,229,827, which is a
(Continued)

(30) Foreign Application Priority Data

Aug. 16, 2006    (GB) .................................. 0616257.2

(51) Int. Cl.
G06F 11/20    (2006.01)
H04L 29/08    (2006.01)
(Continued)

(52) U.S. Cl.
CPC .......... H04L 67/1095 (2013.01); G06F 3/065 (2013.01); G06F 3/067 (2013.01);
(Continued)

(58) Field of Classification Search
None
See application file for complete search history.

(56) References Cited

U.S. PATENT DOCUMENTS 5,592,618 A * 1/1997 Micka ................. G06F 11/2074
711/162
5,682,513 A 10/1997 Candelaria et al.
(Continued)

FOREIGN PATENT DOCUMENTS

CN    1630160     6/2005
EP    1577775     9/2005
(Continued)

OTHER PUBLICATIONS

Machine Translation for JP2006523890, published Oct. 19, 2006, Total 87 pages.
(Continued)

*Primary Examiner* — Jared Rutz
*Assistant Examiner* — Marwan Ayash
(74) *Attorney, Agent, or Firm* — Rabindranath Dutta; Konrad, Raynes, Davda and Victor LLP

(57) ABSTRACT

A storage control system adapted to operate as a remote copy pair by communicating between a primary and a secondary of the remote copy pair comprises a selector for selecting writes to be placed in a batch based on one or more criteria, a sequence number requester for requesting a sequence number for the batch, and a sequence number granter for granting a sequence number for the batch. The storage control system also comprises a batch transmitter for transmitting the batch to the secondary, a permission receiver for receiving a permission to write the batch from the secondary, and a write component responsive to the permission receiver
(Continued)

US 9,923,967 B2

Page 2 to write the batch to completion, wherein the secondary is responsive to the completion to grant a further permission to write for a further batch.

13 Claims, 2 Drawing Sheets

Related U.S. Application Data continuation of application No. 12/377,577, filed as application No. PCT/EP2007/058021 on Aug. 2, 2007, now Pat. No. 9,239,766.

(51) Int. Cl.
G06F 3/06 (2006.01)
G06F 17/30 (2006.01)

(52) U.S. Cl.
CPC ........ *G06F 3/0619* (2013.01); *G06F 11/2064* (2013.01); *G06F 11/2071* (2013.01); *G06F 11/2074* (2013.01); *H04L 67/1097* (2013.01); *G06F 17/30578* (2013.01); *G06F 2201/82* (2013.01)

(56) References Cited

U.S. PATENT DOCUMENTS

| | | | |
|---|---|---|---|
| 5,734,818 | A | 3/1998 | Kern et al. |
| 6,148,383 | A | 11/2000 | Micka et al. |
| 6,978,347 | B2 | 12/2005 | Nakamura et al. |
| 7,055,059 | B2 | 5/2006 | Yanai et al. |
| 7,111,189 | B1 | 9/2006 | Sicola et al. |
| 7,178,055 | B2 | 2/2007 | Ji et al. |
| 7,251,743 | B2 | 7/2007 | Chen et al. |
| 7,278,049 | B2 | 10/2007 | Bartfai et al. |
| 7,328,373 | B2 | 2/2008 | Kawamura et al. |
| 7,363,541 | B2 | 4/2008 | Haagens et al. |
| 7,565,498 | B1 | 7/2009 | Baird et al. |
| 7,606,940 | B2 | 10/2009 | Yamagami |
| 7,657,578 | B1 * | 2/2010 | Karr ............... G06F 11/2069 707/610 |
| 7,823,008 | B2 | 10/2010 | Burr et al. |
| 7,890,715 | B2 | 2/2011 | Burr et al. |
| 8,434,083 | B2 | 4/2013 | Burr et al. |
| 2004/0034808 | A1 | 2/2004 | Day, III et al. |
| 2004/0193802 | A1 | 9/2004 | Meiri et al. |
| 2004/0236983 | A1 | 11/2004 | Burton et al. |
| 2004/0260899 | A1 | 12/2004 | Kern et al. |
| 2004/0260977 | A1 | 12/2004 | Ji et al. |
| 2005/0102553 | A1 | 5/2005 | Cochran et al. |
| 2005/0114562 | A1 | 5/2005 | Barnes et al. |
| 2005/0188254 | A1 | 8/2005 | Urabe et al. |
| 2005/0204105 | A1 | 9/2005 | Kawamura et al. |
| 2005/0216789 | A1 | 9/2005 | Haagens et al. |
| 2005/0223267 | A1 | 10/2005 | Fujibayashi |
| 2007/0038825 | A1 | 2/2007 | Kawamura et al. |
| 2012/0215994 | A1 | 8/2012 | Burr et al. |

FOREIGN PATENT DOCUMENTS

| | | |
|---|---|---|
| JP | H07244597 | 9/1995 |
| JP | 2005243020 | 9/2005 |
| JP | 2006523890 | 10/2006 |
| WO | 2004095289 | 11/2004 |

OTHER PUBLICATIONS

PCT International Search Report and Written Opinion dated Apr. 9, 2008 for Application No. PCT/EP2007/058021 filed Aug. 2, 2007.
Response dated Jun. 2, 2008 for Application No. PCT/EP2007/058021.
"Information Materials for IDS" dated Mar. 27, 2012 from Japanese Office Action dated Mar. 6, 2012 for U.S. Appl. No. 12/377,577, filed Feb. 13, 2009, pp. 2 total.
U.S. Appl. No. 12/377,577, filed Feb. 13, 2009 entitled, "Storage Management System for Preserving Consistency of Remote Copy Data", invented by Dale Burr et al pp. 1-17.
Preliminary Amendment dated Apr. 27, 2012, pp. 1-4, for U.S. Appl. No. 12/377,577, filed Feb. 13, 2009 by inventors Dale Burr at al.
Office action dated Jul. 3, 2012, pp. 1-16, for U.S. Appl. No. 12/377,577 (34.249), filed Feb. 13, 2009, by inventors D. Burr et al.
Response to Office Action dated Oct. 3, 2012, pp. 1-8, for U.S. Appl. No. 12/377,577, filed Feb. 13, 2009, by inventors D. Burr et al.
Final Office Action dated Jan. 11, 2013, for U.S. Appl. No. 12/377,577, filed Feb. 13, 2009, by inventor Dale Burr et al, pp. 1-12.
Response to Final Office Action dated Apr. 11, 2013, for U.S. Appl. No. 12/377,577, filed Feb. 13, 2009, by inventor Dale Burr et al, pp. 1-10.
Response to Office Action, dated Sep. 15, 2014, for U.S. Appl. No. 12/377,577 (37.249) filed Sep. 29, 2010, invented by Dale Burr et al., Total 9 pages.
Final Office Action, dated Jan. 23, 2015, for U.S. Appl. No. 12/377,577 (37.249) filed Sep. 29, 2010, invented by Dale Burr et al., Total 13 pages.
Response to Final Office Action, dated Apr. 23, 2015,for U.S. Appl. No. 12/377,577 (37.249) filed Sep. 29, 2010, invented by Dale Burr et al., Total 15 pages.
Notice of Allowance, dated Sep. 4, 2015, for U.S. Appl. No. 12/377,577 (37.249) filed Sep. 29, 2010, invented by Dale Burr et al., Total 24 pages.
US Patent Application , dated Apr. 27, 2012, for U.S. Appl. No. 13/457,766 (37.249C1), filed Apr. 27, 2012, invented by Dale Burr et al., pp. 1-2.
Preliminary Remarks dated Apr. 27, 2012, for U.S. Appl. No. 13/457,766 (37.249C1), filed Apr. 27, 2012, invented by Dale Burr et al., pp. 1-2.
Office Action, dated Jul. 5, 2012, for U.S. Appl. No. 13/457,766 (37.249C1), filed Apr. 27, 2012, invented by Dale Burr et al., pp. 1-10.
Response to Office Action, dated Oct. 5, 2012, for U.S. Appl. No. 13/457,766 (37.249C1), filed Apr. 27, 2012, invented by Dale Burr et al., pp. 1-7.
Final Office Action, dated Jan. 15, 2013, for U.S. Appl. No. 13/457,766 (37.249C1), filed Apr. 27, 2012, invented by Dale Burr et al., pp. 1-11.
Response to Final Office Action, dated Apr. 15, 2013, for U.S. Appl. No. 13/457,766 (37.249C1), filed Apr. 27, 2012, invented by Dale Burr et al., pp. 1-11.
Office Action, dated Aug. 12, 2014 for U.S. Appl. No. 13/457,766 (37.249C1) filed Apr. 27, 2015, invented by Dale Burr et al. Total 11 pages.
Response to Office Action, dated Nov. 12, 2014, for U.S. Appl. No. 13/457,766 (37.249C1) filed Apr. 27, 2012, invented by Dale Burr et al., Total 7 pages.
Final Office Action, dated Jan. 23, 2015, for U.S. Appl. No. 13/457,766 (37.249C1) filed Apr. 27, 2012, invented by Dale Burr et al., Total 13 pages.
Response to Final Office Action, dated Apr. 23, 2015, for U.S. Appl. No. 13/457,766 (37.249C1) filed Apr. 27, 2012, invented by Dale Burr et al., Total 12 pages.
Notice of Allowance, dated Aug. 31, 2015, for U.S. Appl. No. 13/457,766 (37.249C1) filed Apr. 27, 2012, invented by Dale Burr et al., Total 15 pages.
U.S. Pat. No. 7,363,541 is an English Counterpart to JP2005243020.
Office Action, dated Jun. 13, 2014, for U.S. Appl. No. 12/377,577 (37.249), filed Feb. 13, 2009, entitled "Storage Management System for Preserving Consistency of Remote Copy Data", invented by Dale Burr et al., Total 11 pages.
US Patent Application, dated Aug. 31, 2007, for U.S. Appl. No. 11/848,772, filed Aug. 31, 2007, entitled "Maintaining Consistency in a Remote Copy Data Storage System", invented by Dale Burr et al., Total 25 pages.

(56) References Cited

OTHER PUBLICATIONS

Preliminary Amendment, dated Jan. 25, 2008, for U.S. Appl. No. 11/848,772, filed Aug. 31, 2007, entitled "Maintaining Consistency in a Remote Copy Data Storage System", invented by Dale Burr et al., Total 3 pages.
Office Action, dated Dec. 17, 2009, for U.S. Appl. No. 11/848,772, filed Aug. 31, 2007, entitled "Maintaining Consistency in a Remote Copy Data Storage System", invented by Dale Burr et al., Total 14 pages.
Response to Office Action, dated Mar. 16, 2010, for U.S. Appl. No. 11/848,772, filed Aug. 31, 2007, entitled "Maintaining consistency in a Remote Copy Data Storage System", invented by Dale Burr et al. Total 12 pages.
Notice of Allowance, dated Jun. 22, 2010, for U.S. Appl. No. 11/848,772, filed Aug. 31, 2007, entitled "Maintaining Consistency in a Remote Copy Data Storage System", invented by Dale Burr et al. Total 5 pages.
US Patent Application, dated Nov. 2, 2008, for U.S. Appl. No. 11/934,370, filed Nov. 2, 2007, entitled "Suspension of Asynchronous Remote Copying System", invented by Dale Burr et al., Total 17 pages.
Office Action, dated Jul. 12, 2010, for U.S. Appl. No. 11/934,370, filed Nov. 2, 2007, entitled "Suspension of Asynchronous Remote Copying System", invented by Dale Burr et al., Total 10 pages.
Response to Office Action, dated Aug. 18, 2010, for U.S. Appl. No. 11/934,370, filed Nov. 2, 2007, entitled "Suspension of Asynchronous Remote Copying System", invented by Dale Burr et al.,Total 5 pages.
Notice of Allowance, dated Oct. 5, 2010, for U.S. Appl. No. 11/934,370, filed Nov. 2, 2007, entitled "Suspension of Asynchronous Remote Copying System", invented by Dale Burr et al., Total 5 pages.
US patent Application, dated Nov. 12, 2007, for U.S. Appl. No. 11/938,593, filed Nov. 12, 2007, entitled "Throttling an Asynchronous Remote Copying System", invented by Dale Burr et al., Total 26 pages.
Office Action, dated Apr. 13, 2011, for U.S. Appl. No. 11/938,593, filed Nov. 12, 2007, entitled "Throttling an Asynchronous Remote copying System", invented by Dale Burr et al., Total 12 pages.
Response to Office Action, dated Jul. 13, 2011, for U.S. Appl. No. 11/938,593, filed Nov. 12, 2007, entitled "Throttling an Asynchronous Remote Copying System", invented by Dale Burr et al., Total 14 pages.
Final Office Action, dated Oct. 21, 2011, for U.S. Appl. No. 11/938,593, filed Nov. 12, 2007, entitled "Throttling an Asynchronous Remote Copying System", invented by Dale Burr et al., Total 12 pages.
Response to Final Office Action, dated Dec. 17, 2011, for U.S. Appl. No. 11/938,593, filed Nov. 12, 2007, entitled "Throttling an Asynchronous Remote Copying System", invented by Dale Burr et al., Total 14 pages.
Office Action, dated Mar. 30, 2012, for U.S. Appl. No. 11/938,593, filed Nov. 12, 2007, entitled "Throttling an Asynchronous Remote Copying System", invented by Dale Burr et al., Total 6 pages.
Response to Office Action, dated Jun. 29, 2012, for U.S. Appl. No. 11/938,593, filed Nov. 12, 2007, entitled "Throttling an Asynchronous Remote Copying System", invented by Dale Burr et al., Total 8 pages.
Notice of Allowance, dated Sep. 4, 2012, for U.S. Appl. No. 11/938,593, filed Nov. 12, 2007, entitled "Throttling an Asynchronous Remote Copying System", invented by Dale Burr et al., Total 5 pages.
Notice of Allowance, dated Dec. 24, 2012, for U.S. Appl. No. 11/938,593, filed Nov. 12, 2007, entitled "Throttling an Asynchronous Remote Copying System", invented by Dale Burr et al., Total 5 pages.

* cited by examiner

STORAGE MANAGEMENT SYSTEM FOR PRESERVING CONSISTENCY OF REMOTE COPY DATA

CROSS REFERENCE TO RELATED APPLICATION

This application is a continuation of U.S. patent application Ser. No. 13/457,766, filed Apr. 27, 2012, wherein U.S. patent application Ser. No. 13/457,766 is a continuation of U.S. patent application Ser. No. 12/377,577, filed Feb. 13, 2009, which applications are incorporated herein by reference in their entirety. Patent application Ser. No. 12/377,577 is a national phase filing under 35 U.S.C. § 371 of International Application PCT/EP2007/058021 filed on 2 Aug. 2007, claiming priority from 0616257.2, GB, filed 16 Aug. 2006, which applications are also incorporated herein by reference in their entireties.

BACKGROUND

The present disclosure relates to technology for data storage management, and in particular to a technology for preserving consistency of data in a remote copy facility.

Critical data is often protected against disasters by copying it to another site. One technique in use for this purpose is known as Remote Copy.

Remote Copy is the pairing of a disk (or logical volume) with another disk for use as a backup. The original disk is known as the primary and the backup disk is known as the secondary. Whenever data is written to the primary it must also be written to the secondary, to ensure the backup stays up to date. Remote Copy may be implemented synchronously—that is, so that processing at the host is delayed until confirmation of the completion of the corresponding write at the secondary has been—or it may be implemented asynchronously.

Asynchronous Remote Copy means that the host that wrote the data to the primary is not delayed while data is copied to the secondary; as soon as the data has been written to the primary the host is notified of completion. The data is then copied to the secondary asynchronously.

One of the main challenges when implementing Asynchronous Remote Copy is maintaining consistency of the secondary disk. 'Maintaining consistency' means keeping the secondary data in a state that the primary data could have been in at some point during the process. The secondary data is allowed to be 'out of date' (i.e. a certain number of updates have not yet been applied to the secondary), but it cannot be allowed to be inconsistent.

The table below shows a sequence of events. During these events the secondary is out of date in relation to the primary, but the data it contains always matches something that the host could have read from the primary, and thus the secondary is always consistent.

| Action | Primary | Secondary |
|---|---|---|
| 1. Host writes AAA to disk | AAAXXX | XXXXXX |
| 2. Write from step 1 completes to the host | AAAXXX | XXXXXX |
| 3. Host writes BBB to disk | AAABBB | XXXXXX |
| 4. Remote copy sends AAA to the secondary | AAABBB | AAAXXX |
| 5. Remote copy sends BBB to the secondary | AAABBB | AAABBB |

The table below shows a sequence of events in which the updates to the secondary are applied in the wrong order. The write issued in step 3 is a 'dependent write' as it is issued after the write of AAA completes. BBB can therefore only be written to the disk after AAA.

If the primary had failed after step 4, the secondary would have been left inconsistent, as the host knows that at no point did the primary contain the data XXXBBB.

| Action | Primary | Secondary |
|---|---|---|
| 1. Host writes AAA to disk | AAAXXX | XXXXXX |
| 2. Write from step 1 completes to the host | AAAXXX | XXXXXX |
| 3. Host writes BBB to disk | AAABBB | XXXXXX |
| 4. Remote copy sends BBB to the secondary | AAABBB | XXXBBB |
| 5. Remote copy sends AAA to the secondary | AAABBB | AAABBB |

One approach that has been used in maintaining consistency is the use of what are known as "colours". In this approach, sets of updates are put into groups known as 'colours'. Before applying a colour group a snapshot of the secondary disk is taken. This snapshot is a consistent copy of the secondary data. The updates in the colour group are applied, and if nothing interrupts this process the snapshot is discarded. If something goes wrong during the update process, the snapshot is copied back to the secondary disk, restoring the disk to a consistent state.

Colours are formed at regular intervals (for example, every 5 seconds), with I/O being quiesced before colour formation begins.

The drawbacks of this approach are:

Twice as much storage space is required on the secondary for taking snapshots.

A large amount of processing time will be taken up by the snapshot function, harming system performance.

The Recovery Point Objective (RPO) of the system is relatively high (for example if colours are formed every 5 seconds, then the secondary may be up to 5 seconds out of date in relation to the primary).

A fast, efficient snapshot function is required as snapshots will be taken frequently. The architecture of many storage subsystems prohibits this, so a different approach must be taken.

A second approach that has been used is to assign every single write that enters the primary a unique sequence number, such that if write B arrives after write A it will have a higher sequence number.

The writes are sent to the secondary, which applies them in sequence number order. This ensures that the secondary is consistent at all times, as the writes are applied to the secondary in the exact order they were issued by the host. The drawbacks of this approach are:

Only one write can be in progress at any given time on the secondary, as each write must complete before the write for the next sequence number can begin. This would give an unacceptable level of performance.

On multi-node systems a central server would be required to control the issuing of sequence numbers. Every single write on the primary would result in a message to the server to obtain a sequence number. This would result in a very large number of messages and high consumption of message resources, and also causes delays while waiting for a sequence number to be issued.

It would thus be desirable to have a technological means for preserving consistency of data in a remote copy facility, with minimal additional resource use.

SUMMARY

Certain embodiments provide a storage control system adapted to operate as a remote copy pair by communicating between a primary and a secondary of said remote copy pair. The storage control system comprises a selector for selecting writes to be placed in a batch based on one or more criteria. The storage control system further comprises a sequence number requester for requesting a sequence number for said batch. Also included in the storage control system is a sequence number granter for granting a sequence number for said batch. Furthermore, the storage control system includes a batch transmitter for transmitting said batch to said secondary and a permission receiver for receiving a permission to write said batch from said secondary. The storage control system also includes a write component responsive to said permission receiver to write said batch to completion, wherein said secondary is responsive to said completion to grant a further permission to write for a further batch.

In certain embodiments, said write component comprises a concurrent write component for concurrently executing a plurality of writes.

In certain additional embodiments, said one or more criteria comprises mutual independence of said writes.

Certain further embodiments provide a method or logic arrangement for a storage control system adapted to operate as a remote copy pair by communicating between a primary and a secondary of said remote copy pair. A selection is made of writes to be placed in a batch based on one or more criteria and a sequence number is requested for said batch. A sequence number is granted for said batch and said batch is transmitted to said secondary. A permission is received to write said batch from said secondary, and responsive to said permission said batch is written to completion, wherein said secondary is responsive to said completion to grant a further permission to write for a further batch.

In certain embodiments the writing comprises concurrently executing a plurality of writes.

In certain embodiments there is provided a computer program comprising computer program code to, when loaded into a computer system and executed thereon, cause said computer system to perform all the steps of the method or logic arrangement described above.

Certain embodiments of the invention contemplate, in their broadest aspect, a technical framework for preserving consistency of data in a remote copy facility.

BRIEF DESCRIPTION OF THE DRAWINGS

Certain embodiments will now be described, by way of example only, with reference to the accompanying figures, in which.

DETAILED DESCRIPTION

Certain embodiments are broadly directed to preserving consistency of data in a remote copy facility.

A first exemplary embodiment of the present invention comprises placing the writes into sequence number batches, and sending one batch at a time to the secondary. In this manner, writes that are independent of one another may be assigned the same sequence number. The primary sends a batch of writes (e.g. all writes with sequence number 17) to the secondary. When these writes have completed, the next batch (e.g. for sequence number 18) is sent to the secondary. The secondary processes all writes as it receives them. This increases secondary concurrency and reduces the amount of inter-node messaging.

One drawback of this approach is that it does not fully utilise the long distance communications channel; the channel is idle from the time the last write in a batch is sent until the last write in the batch completes. As this could be of the order of 100 ms, the link utilization is not optimal.

In certain additional exemplary embodiments, therefore, a more efficient approach for allocating sequence numbers is proposed, as will be outlined below.

The exemplary method of assigning sequence numbers to writes is based on the following observations:

All writes that have been issued by the host without receiving completions must be independent (none of them have completed, so none can depend on another).

All such writes can be given the same sequence number and applied in any order on the secondary, as they can be applied in any order on the primary.

On a multi-node system, batches are formed in two places:

All writes that are outstanding on a given node can be placed in the same batch. Only one sequence number request for the whole batch needs to be sent to the sequence number server, greatly reducing the number of messages and message resources that are required.

All requests that arrive at the sequence number server can be placed in the same batch. This increases the batch size further, increasing the number of writes that can be done concurrently on the secondary, improving performance.

The implementation below describes one instance of the protocol to be used in an exemplary embodiment of the present invention. All writes to disks that are related must use the same instance of the protocol, to ensure that consistency between these disks is maintained. Unrelated disks may use different instances of the protocol (i.e. they can have separate sequence number servers and clients). This is achieved in certain embodiments as described below, with reference to the figures.

Figure 1:
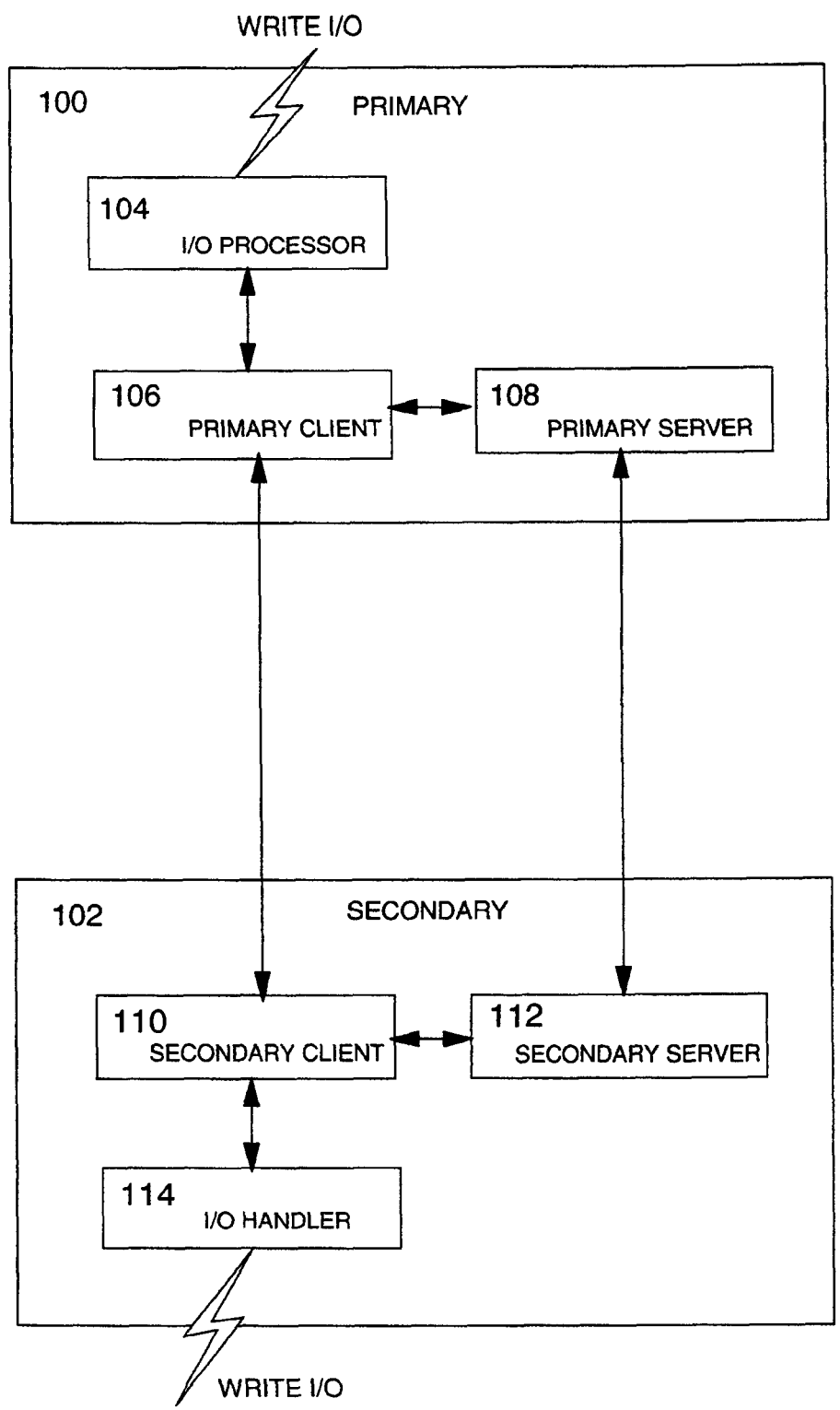
FIG. 1 shows in schematic form an arrangement of components in accordance with an exemplary embodiment.

Turning to FIG. 1, there is shown an arrangement of components in accordance with an exemplary embodiment of the present invention. In FIG. 1, primary 100 comprises an I/O processor 104 for receiving write I/O commands, normally from a host apparatus (not shown). I/O processor is in operative communication with primary client 106, which is cooperatively connected to primary server 108. Secondary 102 comprises secondary client 110, which is operatively coupled to secondary server 112 and I/O handler 114. I/O handler 114 is operable in communication for the purpose of performing write I/Os with data storage (not shown), which may comprise any of the known forms of data storage, for example, but not limited to, magnetic disk storage, tape storage or the like. Primary client 106 at primary 100 is linked over a communications link with secondary client 110 at secondary 102, and primary server 106 at primary 100 is linked over a communications link with secondary server 110 at secondary 102. The arrangement and location of primary and secondary clients and servers is intended to be exemplary only, and many other arrangements are envisaged, as for example, locating clients or servers at intermediate and communicating nodes of a data processing or communications network. Such alternative arrangements of client and server devices, systems or modules are well understood by those of ordinary skill in the art, and need not be further described here.

Certain embodiments of the present invention in the form of a system or apparatus advantageously addresses the problem of providing a technological means for preserving consistency of data in a remote copy facility.

Figure 2:
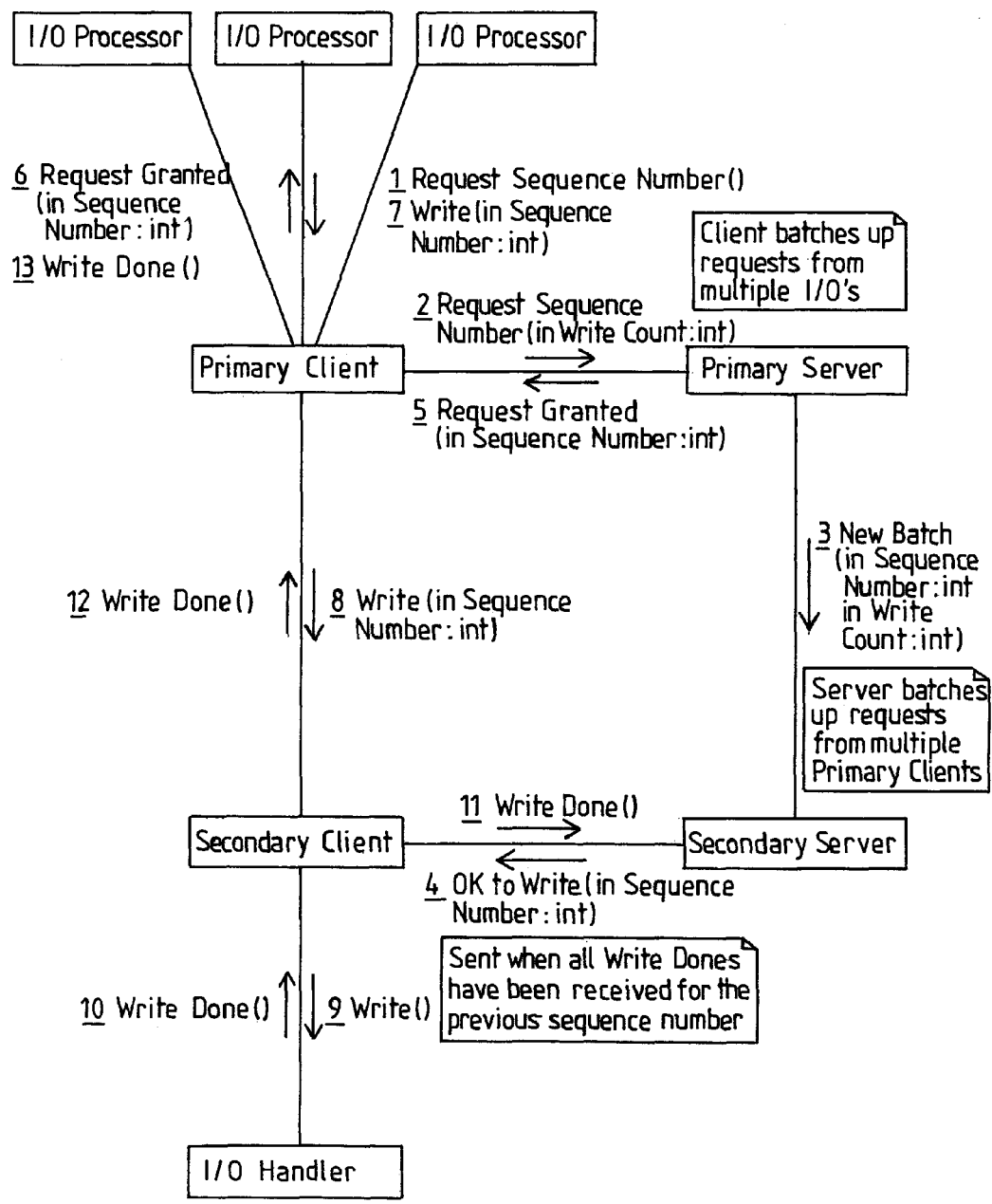
FIG. 2 shows in schematic form one method or one logic arrangement in which a method of operation according to an exemplary embodiment may be implemented.

Turning to FIG. 2, there is shown in schematic form one method or one logic arrangement in which a method of operation according to an exemplary embodiment of the present invention may be implemented. It will be clear to one of ordinary skill in the art that many modifications and variations, including, for example, variations in the sequence of steps, may be made without departing from the scope of the present invention.

The system in which a method of operation according to an exemplary embodiment of the present invention may be implemented comprises the following components as illustrated in FIG. 2:

PrimaryClient. Every node where write I/Os are received will need to have a PrimaryClient. When a write I/O is received, the I/O code requests a sequence number from the PrimaryClient. The PrimaryClient batches up all concurrent requests and sends a RequestSequenceNumber message to the PrimaryServer. When a sequence number is granted, the PrimaryClient sends the write I/O to the SecondaryClient, embedding the sequence number within the Write message. Only write I/Os that were active when the RequestSequenceNumber was issued may be assigned the granted sequence number, to prevent dependent writes being placed in the same batch (in a multi-node system other nodes may have received their grants and completed their I/Os already).

PrimaryServer. Only one PrimaryServer will exist. It receives RequestSequenceNumber messages from the PrimaryClients, batches up all concurrent requests, and replies to the PrimaryClients, sending them the granted sequence number. It also sends a NewBatch message to the SecondaryServer, telling it the sequence number that was issued, and how many write I/Os were granted the sequence number.

SecondaryClient. The SecondaryClient receives Write messages from the PrimaryClient. Each write is placed on a queue. When the SecondaryClient receives an OkToWrite message for a sequence number it pulls all writes for this sequence number off the queue and executes them. When each write completes it sends WriteDone messages to the PrimaryClient and SecondaryServer.

SecondaryServer. The SecondaryServer receives NewBatch messages from the PrimaryServer. The SecondaryServer is responsible for co-ordinating the SecondaryClients, ensuring that writes are processed in sequence number order to maintain data consistency. When the first NewBatch arrives, the SecondaryServer sends an OkToWrite message to each SecondaryClient so that they can process writes for the first sequence number as soon as they arrive. When the SecondaryServer has received the expected number of WriteDone messages (one WriteDone for each write in the batch) it sends OkToWrite messages for the next sequence number.

An exemplary method is as follows:

Step 1: one of more of the I/O processors issues a request for a sequence number to the primary client.

Step 2: the primary client issues the request for a sequence number to the primary server.

Step 3: the primary server issues a new batch request to the secondary server, and batches up a plurality of requests that have been received from the primary clients.

Step 4: the secondary server sends an "OK to write" message for the specified sequence number to the secondary client. Step 4 can only take place when there are no outstanding writes for a previous sequence number, should one exist.

Step 5: the primary server grants the request for a sequence number to the primary client.

Step 6: the primary client passes the "request granted" message on to the or each requesting I/O processor.

Step 7: the or each I/O processor in turn issues a write for the specified sequence number to the primary client.

Step 8: the primary client issues the write request for the specified sequence number to the secondary client.

Step 9: the write is issued to the I/O handler, which performs the write I/O.

Step 10: the I/O handler returns a "write done" message to the secondary client.

Step 11: the secondary client passes the "write done" message to the secondary server.

Step 12: the secondary client passes the "write done" message to the primary client.

Step 13: the primary client passes the "write done" message back to the relevant I/O processor.

Certain embodiments of the present invention in the form of a method or logic arrangement thus advantageously addresses the problem of providing a technological means for preserving consistency of data in a remote copy facility, with minimal additional resource use. It will be clear to one of ordinary skill in the art that certain of the steps shown here in sequential fashion as they are numbered may in fact be processed concurrently, and that certain steps may be required to wait for the completion of other operations, and that the sequence shown is merely exemplary of the processing that may be performed by an embodiment of the present invention. For example, as shown above, the performance of step 4 may be delayed until after the completion of all steps 5 to 11 for a preceding sequence number, or step 4 may be performed immediately, as, for example, on a first iteration of the steps of the method, when no write activity for any previous sequence number would be in process.

It will be clear to one of ordinary skill in the art that all or part of the method of the exemplary embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the exemplary embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, exemplary embodiments of the present invention may be realized in the form of a computer implemented method of deploying a service comprising steps of deploying computer program code operable to, when deployed into a computer infrastructure and executed thereon, cause the computer system to perform all the steps of the method.

In a further alternative, the exemplary embodiments of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. A method implemented in a primary device comprising a primary client and a primary server, and a secondary device comprising a secondary client, a secondary server, and an input/output (I/O) handler, wherein the primary device is in communication with the secondary device, wherein the primary client is a first primary client, the method comprising:
   selecting, by a first primary client, first writes to be placed in a first batch based on mutual independence of the first writes;
   requesting, by the first primary client, a sequence number for the first batch to the primary server;
   selecting, by a second primary client, second writes to be placed in a second batch based on mutual independence of the second writes;
   requesting, by the second primary client a sequence number for the second batch to the primary server, wherein the first primary client and the second primary client are both coupled to the primary server;
   combining, by the primary server, the first batch and the second batch, into a combined batch;
   granting, by the primary server included in the primary device, a sequence number for the combined batch, wherein the first writes and the second writes that are placed in the combined batch are independent of one another and are granted a same sequence number;
   transmitting, by the primary server, the sequence number of the combined batch to the secondary server of the secondary device, wherein the secondary server on receiving the sequence number of the combined batch transmits a permission to write the combined batch to each of a plurality of secondary clients managed by the secondary server;
   receiving, by each of the plurality of secondary clients, the permission to write the combined batch from the secondary server, and in response to receiving the permission to write, performing writes by the plurality of secondary clients on receiving the writes from primary clients; and
   in response to the secondary server receiving an expected number of write completion messages corresponding to one write completion message for each write in the combined batch, providing by the secondary server a new permission to write for a new sequence number to each of the plurality of secondary clients.

2. The method of claim 1, wherein the method further comprises:
   receiving, by the primary client, a request from one or more input/output (I/O) processors, for the sequence number;
   issuing, by the primary client, the request for the sequence number to the primary server;
   issuing by the primary server, a new batch request to the secondary server, wherein the primary server batches up a plurality of requests that have been received from one or more primary clients; and
   sending, by the secondary server a message authorizing writes for the sequence number to a secondary client, in response to determining that there are no outstanding writes for a previous sequence number.

3. The method of claim 2, the method further comprising:
   granting, by the primary server the request for the sequence number to the primary client; and
   sending, by the primary client, an indication that the request is granted to the one or more I/O processors, wherein the one or more I/O processors issue writes for the sequence number to the primary client.

4. The method of claim 3, the method further comprising:
   issuing, by the primary client, a write request for the sequence number to the secondary client, wherein the write request is issued to an I/O handler which performs a write I/O, wherein the I/O handler returns a message confirming that the write I/O is completed to the secondary client, and the secondary client passes the message confirming that the write I/O is completed to the secondary server.

5. The method claim 4, the method further comprising:
   passing, by the secondary client, the message confirming that the write I/O is completed to the primary client.

6. The method of claim 5, the method further comprising:
   passing, by the primary client the message confirming that the write I/O is completed.

7. The method of claim 1, wherein the performing of the writes comprises concurrently executing a plurality of writes.

8. The method of claim 1, wherein all writes that have been issued by a host without receiving completions are independent.

9. The method of claim 8, wherein all the writes that have been issued by the host without receiving completions are given the same sequence number.

10. The method of claim 9, wherein all writes that are outstanding on a node of a plurality of nodes are placed in a same batch.

11. The method of claim 1, wherein in a multi-node system:
all writes to disks that are related use a same sequence number server to ensure that consistency between the disks is maintained; and
unrelated disks use different sequence number servers.

12. The method of claim 11, wherein:
in the multi-node system all writes that are outstanding on a given node are placed in a same batch; and
instead of a central server for the multi-node system to generate sequence numbers, each primary server of each primary device generates the sequence numbers.

13. The method of claim 1, the method further comprising:
deploying a computing infrastructure, wherein the deploying of the computing infrastructure comprises integrating computer program code into the primary device, and wherein the computer program code, in response to being executed, performs the selecting, the requesting, the granting, the transmitting, the receiving of the permission, the performing of the writes, and receiving of the new permission.

* * * * *